United States Patent [19]
Fleiss

[11] 3,772,737
[45] Nov. 20, 1973

[54] MANUALLY ACTUATABLE MEAT TENDERIZER

[76] Inventor: Victor P. Fleiss, Rte. No. 2, Box 257-H, Valrico, Fla. 33594

[22] Filed: Nov. 23, 1971
[21] Appl. No.: 201,339

[52] U.S. Cl. .................................................. 17/30
[51] Int. Cl. ............................................. A22c 9/00
[58] Field of Search ............................ 17/25, 30, 31

[56] References Cited
UNITED STATES PATENTS

| 212,505 | 2/1879 | Richmond | 17/30 |
| 1,170,772 | 2/1916 | Mitchel | 17/30 |
| 2,392,036 | 1/1946 | Fleming | 17/30 |
| 307,802 | 11/1884 | Richmond | 17/30 |
| 231,301 | 8/1880 | Fleck | 17/30 |
| 210,503 | 12/1878 | Coulter | 17/30 |
| 1,421,458 | 7/1922 | Gregory | 17/30 X |

Primary Examiner—Louis G. Mancene
Assistant Examiner—D. L. Weinhold
Attorney—Harvey B. Jacobson et al.

[57] ABSTRACT

A manually grippable and actuatable portable type meat tenderizer characterized, generally stated, by two units. One unit constitutes a handling and tenderizing unit and is structurally designed to be held in and operated by one hand. The complemental unit is an adapter for the first-named unit. The first-named unit embodies a handle having a lower end provided with a pounding head equipped with meat penetrating and cutting elements or tines. The adapter unit has guide means for the handle and head and, in addition, an apertured plate which functions as a stripper for the extensible and retractable tines.

3 Claims, 5 Drawing Figures

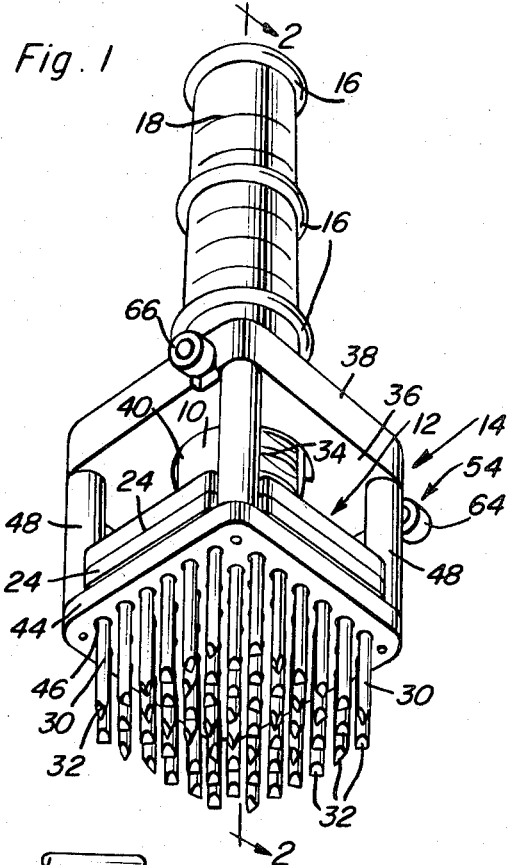
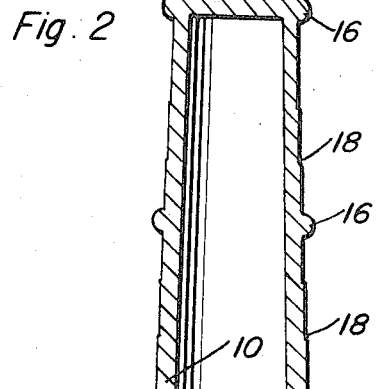
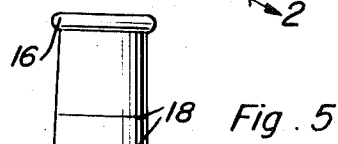
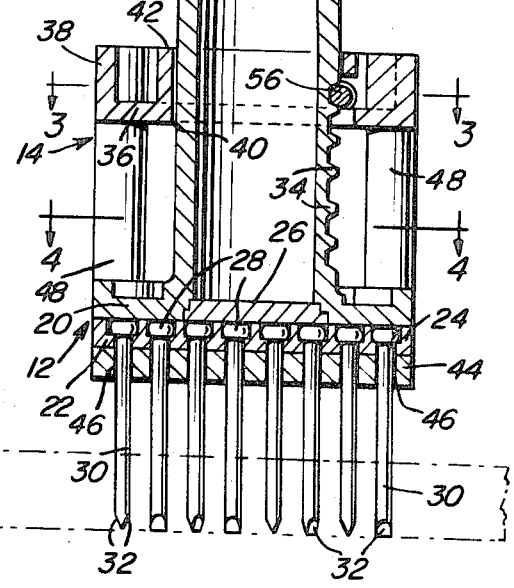
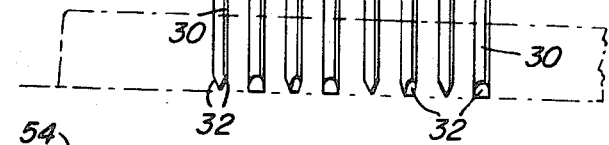
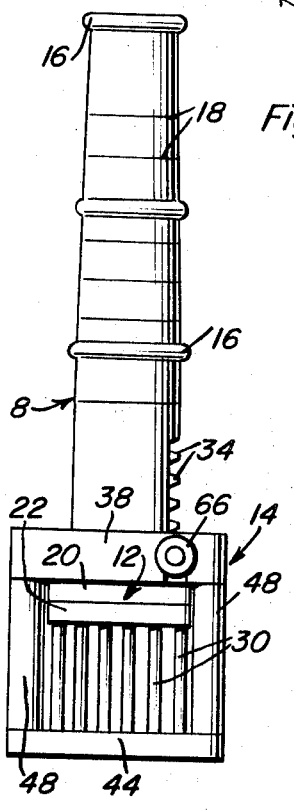
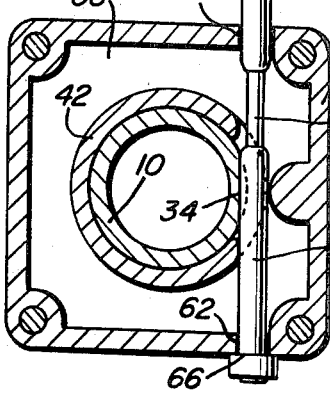
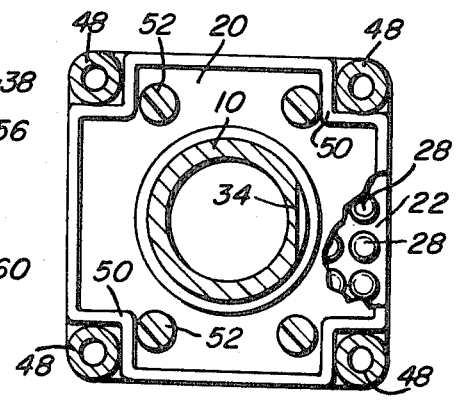

MANUALLY ACTUATABLE MEAT TENDERIZER

The present invention relates to certain new and useful improvements in a hand-held and actuated implement which is characterized by two structurally coordinated and cooperating units, one unit having a handle with a cutter head and the other unit providing an adapter therefor and having the desired guiding and stripping means.

Many and varied types of meat tenderizers have been devised and offered for use by others who have recognized the problem at hand and have devised implements which have aided users in coping with the problem in one manner or another. For background purposes, reference can be made to the meat tenderer of Myron J. Mitchel, U.S. Pat. No. 1, 170,772. Mitchel is cited because it shows a handle having head means at a lower end provided with penetrating tines cooperating with a stripper plate. As having a more significant bearing on the matter at hand attention is invited to my prior U.S. Pat. No. 2,830,317 which has to do with a presslike machine or device embodying raisable and lowerable means which functions to perforate a chunk or piece of meat and which enables the user thereof to effectually tenderize the meat preparatory to cooking the same. As will be hereinafter more clearly evident, many of the features and advantages which accompany prior U.S. Pat. No. 2,830,317 will be found to exist, generally stated, in the present invention but need not be dwelled upon at this point in the disclosure.

By way of comparison, with prior U.S. Pat. No. 2,830,317, it will be noted that the patented meat tenderizer comprises a heavy duty press type whereas the present invention pertains to a hand-held implement wherein the knife-like tines or cutters are forcibly and intermittently pounded into the meat in keeping with the needs and discretion of the user.

Briefly, the improved tenderizer has to do with two complemental relatively movable units, namely, a handling and tenderizing unit which is such in construction and capability that it provides a handle which is held in and operated by one hand of the user, and a complemental or companion adapter unit. The handling and tenderizing unit embodies a rigid upstanding handle which can be grasped and held with requisite nicety and in a manner that knife-like penetrating tines on the specially constructed head can be pounded into the sinews and fibers in a time-and-labor saving manner. The adapter unit embodies a top plate having a centrally located guide collar for the handle, and a bottom plate which is situated below and parallel with the top plate and which is apertured to provide a stripper plate for the tines. These plates are rigidly connected together at their corner portions and stabilize the functioning of the headed handle. The handle has rack means to accommodate latch means, the latch means being mounted on the top plate of the adapter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a manually actuatable meat tenderizer constructed in accordance with the invention and showing the cutting knives or tines fully projected;

FIG. 2 is an enlarged view with parts in section and elevation taken approximately on the plane of the central vertical section line 2—2 of FIG. 1, looking in the direction of the indicating arrows;

FIG. 3 is a horizontal section taken on the plane of the horizontal section line 3—3 of FIG. 2;

FIG. 4 is a similar sectional view taken on the plane of the section line 4—4 of FIG. 2; and FIG. 5 is a view on a suitably small scale showing the tines fully retracted and shielded within the encompassing confines of the frame-like adapter unit.

The aforementioned handling and tenderizing unit is such in construction that it can be held in one hand of the user and this unit is denoted by the numeral 8. It is characterized, generally stated, by a hollow but rigid lightweight plastic or equivalent handle 10 having a sectional head 12 at the lower end thereof. The head is provided with cutting means which will be described in detail as the description proceeds. The unit 8 is cooperable with the companion adapter unit, the latter being denoted, generally stated, by the numeral 14. In actual practice, both units can be and preferably are made of moldable plastic material.

The unit 8 embodies a hollow handle which in practice may be some six inches more or less in length. The peripheral surface is provided at longitudinally spaced points with encompassing or encircling anti-slipping beads 16. In addition and also if desired, this peripheral surface can be provided with additional distributively arranged anti-slipping shoulders 18. The lower or leading end is provided with a sectional head which, more specifically, comprises an outstanding flange constituting a backing plate 20 and an underlying companion plate 22 having an upstanding marginal flange 24 abutting the backing plate. The otherwise open lower end of the hollow handle is closed by a suitably fitted insert 26 which is plugged in place and held in the manner shown in FIG. 2. This plug, in conjunction with the flange 20, constitutes the over-all backing plate for the headed upper ends 28 of the knife-like cutting elements 30. More specifically, these cutting elements comprise appropriately headed rigid stainless steel nails. The lower or leading ends of the nails are beveled in upwardly diverging relationship as at 32 to provide knife-like cutting tips which function in a self-evident manner. The upstanding flange 24, encircling the ribbed plate 22, provides a plurality of pockets for the headed upper ends 28 of the tines. The tines proper project downwardly through and beyond apertures provided in the plate 22, the apertures being such and the pocketed heads also being such that the tines are anchored but swivelly mounted and are capable of turning continuously while is use for effective penetrating and cutting results. It will be further noted that upwardly of the backing plate the handle is provided on one vertical side with horizontal rack teeth 34 which serve in a manner to be described. Thus, the unit 8 comprises a headed handle with appropriate gripping and anti-slipping means and with the dual plate head having swivelly mounted side-by-side knife-like cutting tines. This headed tine-equipped handle alone could perhaps be used as a pounding and penetrating implement. However, experience has shown that it is desirable to provide the handle unit 8 with the complemental adapter unit 14. to achieve the desired end result. In carrying out this phase of the matter it will be seen that the numeral 36 designates a generally rectangular top plate marginally encompassed by an upstanding reinforcing flange 38. This plate is centrally apertured as at 40 and provided with an integral upstanding annular guide collar 42 through which the rack portion of the handle is slidingly operable. This top plate cooperates with an underlying aligned coacting bottom plate 44 which has a plurality of openings therein as at 46 through and beyond which the tines extend, permitting the plate 44 to provide not only for guidance of the tines but also as a cleaning and stripper plate. These two plates 36 and 44 are connected at their corner portions by rigidifying post-like connectors 48. It will be observed that the respective corner portions 50 of the plates 20 and 22 are provided with proportioned and shaped guides which are cooperatively and slidably engageable with the coacting guide posts 48. It will be further noted particularly in FIG. 4 that the two plates 20 and 22 are separably fastened together by screws or the like 52, making it possible to separate the two plates and to replace worn or improperly functioning tines.

It is desirable to fully project the tines to assume, for example, the position shown in FIGS. 1 and 2 whenever necessary or desired. It is likewise desirable to fully retract the tines so that they are within the confines of the then encompassing and protecting frame-like adapter unit 14 as brought out in FIG. 5. The adapter unit is provided with latching means which is denoted generally at 54. This latching means comprises a push-pull rod which has restricted central portion 56 which is releasably engageable with the rack teeth and relatively stout end portions 58 and 60 which are slidable in the guide openings 62 provided therefor as shown in FIG. 3. The increased or stout end portions are provided with enlarged terminal gripping heads 64 and 66 which can be caught hold of and pushed and pulled in order to line up the component 60 with the rack teeth for latching or retaining results or for registering the restricted central portion 56 with the rack teeth to allow the handle to be adjusted relative to the adapter or, alternatively, the adapter relative to the headed handle.

In actual practice and stated somewhat generally, the practice is, when using the device, to place steak, chop or lean meat on a chopping block (not shown). For meats of one inch thickness, the tines or knives should be extended about one-half inch. Normally the meat is held down with a fork and the tines after adjustment are hammered or pounded so that they may tenderize half-way into the meat or can be continued until the meat has been tenderized to the desired degree or extent necessary. It is also desirable to turn the meat over and to repeat the tenderizing steps. Manifestly, the extent of tenderizing is up to the taste and discretion of the user.

Experience has shown that meat tenderized with this tenderizing implement dispenses with the need for adding any liquids, salts or powders which might detract from the original flavor of the meat or confuse the seasoning taste. The multiplicity of cutting tines function to break down the sinews and fibers in the meat in a matter of seconds thereby reducing the cooking time by at least 50 percent. In fact, the use of the tenderizer enables one to obtain superior results with less expensive cuts of meats. Then, too, experience has shown that the tenderizer disclosed can handle all cuts of meat, including bone-in chops, and will thoroughly tenderize cuts up to three inches thick without actually spreading the meat.

The invention lends itself to practical use on the several grades of meat sold to the general public, that is, prime (highest in price), choice (medium price) and good (lowest in price). Prime is the fattiest of meats and therefore has the most waste and the least amount of fiber, which makes it the most tender. Choice is less fatty with a smaller amount of waste and a small amount of fiber. Good has the least amount of fat content and therefore has less waste, but because of the lack of fatty grains, this grade of meat is more difficult to chew, as it has the most amount of fibers. In other words, the more fat, the less fiber, yet all of these different grades of meat have practically the same basic flavor.

For the housewife who wants a steak with good flavor and the least amount of waste, "good" graded meat would be the least costly, but probably the toughest to eat. However, with this new tenderizer, it is possible for the housewife to save money on the purchase of all meats and have the most tender steaks to serve her family and friends.

It is submitted that reference to the views of the drawing in conjunction with the description of the details will enable the reader to obtain a clear and comprehensive understanding of the construction and preferred manner of use of the tenderizer. Accordingly, a more extended description is deemed t be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A manually actuatable portable type meat tenderizer comprising a plastic handling and tenderizing unit designed and adapted to be held in one hand, bodily raised and lowered and pounded against a supported fork-held piece of meat which is to be tenderized, said unit embodying a hollow but rigid upstanding handle capable of being grasped with one hand and held in an upstanding position when pounded and being used, said handle having a lower end provided with a rigid pounding head, said head embodying a marginally flanged and rigidified backing plate, a second plate complemental, opposed to, abutting and separably fastened beneath said backing plate, and having a plurality of individual distributively arranged tine accommodating pockets and aligned tine holes, a multiplicity of duplicate tines, each tine having a headed upper end seated in a pocket provided therefor and firmly abutting said backing plate, that portion of the tine adjacent the head passing downwardly through and being freely turnable in the tine hole provided therefor, the lower end of each tine being provided with a knife-like meat penetrating end, and a plastic adapter unit for said handle separate from but complemental to and carried by the headed end portion of said handle, said adapter unit comprising a marginally flanged top plate having a centrally located guide opening and an aligned upstanding collar marginally encompassing said guide opening, said collar snugly but guidingly surrounding a cooperating sliding surface portion of said handle, a companion bottom plate spaced below, aligned and parallel with said top plate, a plurality of individual circumferentially spaced post-like members integrally connecting and spacing the respective corner portions of said top and bottom plates, said bottom plate having a multiplicity of tine receiving and stabilizing holes therethrough and said tines extending slidingly and guidingly into and through said stabilizing holes, said tines corresponding in prescribed length being retractable and extensible and the holes in the plate transforming said bottom plate into a stripper and cleaner plate for said tines, said head and tines carried thereby being proportional with said backing plate and complemental second plate and post like members and adapted to be confined and stored when fully retracted between said top and bottom plates when not being used.

2. The meat tenderizer defined in claim 1, and wherein one side surface portion of said handle adjacent said head is provided with a vertical row of spaced parallel teeth conjointly providing an adjusting rack for said handling and tenderizing unit, the marginally flanged portion of said top plate being provided with a manually actuatable slidingly mounted push-pull tine adjusting and retaining rod provided at opposite accessibly extending terminal ends with selectively usable finger-gripping and actuating knobs, said push-pull rod having a reduced median portion and predetermined coordinating relatively enlarged end portions retentively and releasably engageable with the rack teeth in a manner to permit the tines to be adaptably and retentively adjusted relative to the underneath face of said bottom plate in keeping with the tine penetrating needs at hand.

3. The meat tenderizer defined in and according to claim 2, and wherein said backing plate and complemental plate have their respective corner portions formed with post receiving and clearance notches providing guides which are aligned and cooperatively slidably engageable with the respective post-like members.

* * * * *